United States Patent
Fang et al.

(10) Patent No.: US 10,164,763 B2
(45) Date of Patent: Dec. 25, 2018

(54) TRANSMITTER, RECEIVING DEVICE, AND FREQUENCY OFFSET CORRECTION METHOD

(71) Applicant: Huawei Technologies Co., Ltd., Shenzhen (CN)

(72) Inventors: Yuanyuan Fang, Shenzhen (CN); Jialong Shuai, Wuhan (CN); Qiang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 60 days.

(21) Appl. No.: 15/351,131

(22) Filed: Nov. 14, 2016

(65) Prior Publication Data
US 2017/0063519 A1   Mar. 2, 2017

Related U.S. Application Data

(63) Continuation of application No. PCT/CN2014/077430, filed on May 14, 2014.

(51) Int. Cl.
*H04B 10/572* (2013.01)
*H04B 10/2507* (2013.01)
(Continued)

(52) U.S. Cl.
CPC ....... *H04L 7/0075* (2013.01); *H04B 10/2507* (2013.01); *H04B 10/503* (2013.01); *H04B 10/548* (2013.01); *H04B 10/572* (2013.01)

(58) Field of Classification Search
CPC .................................................. H04B 10/572
See application file for complete search history.

(56) References Cited

U.S. PATENT DOCUMENTS

| | | | |
|---|---|---|---|
| 2002/0176457 A1* | 11/2002 | DeCusatis | H04B 10/506 372/26 |
| 2008/0212656 A1 | 9/2008 | Feher | |
| 2014/0079164 A1* | 3/2014 | Zhang | H04L 27/2601 375/343 |

FOREIGN PATENT DOCUMENTS

| CN | 101154990 A | 4/2008 |
|---|---|---|
| CN | 103457902 A | 12/2013 |

OTHER PUBLICATIONS

Shieh et al., Coherent optical OFDM: has its time come?, Journal of Optical Networking, vol. 7, No. 4, Feb. 29, 2008; retrieved from the internet Mar. 9, 2018 <url: http://people.eng.unimelb.edu.au/shiehw/TimeforCOOFDM.pdf>.*

(Continued)

*Primary Examiner* — Nathan M Cors
(74) *Attorney, Agent, or Firm* — Leydig, Voit & Mayer, Ltd.

(57) ABSTRACT

According to a transmitter, a receiving device, and a frequency offset correction method that are provided in embodiments of the present invention, after a power parameter of a pilot in an OFDM signal received by a receiving device is detected, a frequency offset value used to indicate a degree and a direction that are of a difference that is between a center frequency of a filter and a center frequency of a laser and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system.

17 Claims, 5 Drawing Sheets

(51) Int. Cl.
*H04L 7/00* (2006.01)
*H04B 10/50* (2013.01)
*H04B 10/548* (2013.01)

(56) References Cited

OTHER PUBLICATIONS

Yi et al., "Phase Estimation for Coherent Optical OFDM," IEEE Photonics Technology Letters, vol. 19, No. 12, pp. 919-921, Institute of Electrical and Electronics, New York, New York (Jun. 15, 2007).

Nazarathy et al., "Doubly-Differential Coherent 100G Transmission: Multi-Symbol Decision-Directed Carrier Phase Estimation with Intradyne Frequency Offset Cancellation," (2010).

* cited by examiner

TRANSMITTER, RECEIVING DEVICE, AND FREQUENCY OFFSET CORRECTION METHOD

CROSS-REFERENCE TO RELATED APPLICATIONS

This application is a continuation of International Application No. PCT/CN2014/077430, filed on May 14, 2014, the disclosure of which is hereby incorporated by reference in its entirety.

TECHNICAL FIELD

The present invention relates to communications technologies, and in particular, to a transmitter, a receiving device, and a frequency offset correction method.

BACKGROUND

Orthogonal frequency division multiplexing (OFDM) is a multi-carrier modulation technology, including single sideband modulation and double sideband modulation. In a single sideband modulation OFDM system, at a transmit end, a to-be-sent signal may be carried on an optical carrier transmitted by a laser, then single sideband filtering is performed by using a filter on the optical carrier that carries the to-be-sent signal, and therefore an OFDM signal is transmitted. After the transmitted OFDM signal is transmitted by using an optical fiber link, a transmitted data signal is correspondingly received performed at a receive end according to a pilot in the OFDM signal. In the foregoing OFDM system, a frequency offset phenomenon usually occurs, that is, after performing the single sideband filtering, the filter cannot filter out a carrier frequency at a fading point, which causes deterioration of system performance. Therefore, frequency offset correction needs to be performed on the OFDM system.

In the prior art, a perturbation signal is usually pre-used to implement scrambling on the laser, then a wavelength locker is used to detect the OFDM signal transmitted by the laser, and a center frequency of the laser is determined according to a correspondence that is between the perturbation signal and the center frequency of the laser and that is obtained by means of detection by the wavelength locker, so that the center frequency of the laser is adjusted when offset of the center frequency of the laser occurs, and frequency offset correction of the OFDM system is implemented. As can be seen, the prior art is only applicable to frequency offset caused by the offset of the center frequency of the laser, and efficiency of frequency offset correction is low.

SUMMARY

Embodiments of the present invention provide a transmitter, a receiving device, and a frequency offset correction method, so as to resolve a technical problem in the prior art that efficiency of frequency offset correction is low.

A first aspect of the embodiments of the present invention provides a receiving device, including: a detection module, configured to detect a power parameter of a pilot in a received orthogonal frequency division multiplexing OFDM signal; a determining module, configured to determine a frequency offset value according to the power parameter of the pilot, where the frequency offset value is used to indicate a degree and a direction that are of a difference that is between a center frequency of a filter and a center frequency of a laser configured to transmit the OFDM signal in a transmitter and that deviates from a first threshold, the filter includes a multiplexer configured to filter the OFDM signal in the transmitter, and the first threshold is a difference between a center frequency of the laser and a center frequency of the filter when a bit error rate of the OFDM signal is lowest; and a sending module, configured to send the frequency offset value.

In a first possible implementation manner of the first aspect, the determining module is specifically configured to perform calculation according to a linear correspondence between the predetermined power parameter p of the pilot and the frequency offset value y, so as to obtain the frequency offset value $y=kp+c$, where k and c are constants obtained by testing the linear correspondence between the power parameter p of the pilot and the frequency offset value $y=(v_1-v_2)-\Delta$ in a manner in which the center frequency $v_1$ of the filter remains unchanged and the center frequency $v_2$ of the laser is shifted, and $\Delta$ is the first threshold.

In a second possible implementation manner of the first aspect, the determining module includes: a comparison unit, configured to compare the power parameter p of the pilot that is obtained by means of detection with a second threshold $P_0$, where the second threshold is a power parameter of the pilot that is detected when the difference between the center frequency of the filter and the center frequency of the laser is equal to the first threshold; a first determining unit, configured to: if the power parameter p of the pilot is greater than the second threshold $P_0$, determine that the frequency offset value is +S, where S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$; and a second determining unit, configured to: if the power parameter p of the pilot is less than the second threshold $P_0$, determine that the frequency offset value is −S, where S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

With reference to the first aspect, the first possible implementation manner of the first aspect, and the second possible implementation manner of the first aspect, in a third possible implementation manner of the first aspect, the power parameter of the pilot includes a difference between power of a low frequency pilot and power of a high frequency pilot, and at least one of the power of the lower frequency pilot or the power of the high frequency pilot, where a frequency of a subcarrier used to carry the low frequency pilot is lower than a frequency of a subcarrier used to carry the high frequency pilot.

With reference to the first aspect, the first possible implementation manner of the first aspect, the second possible implementation manner of the first aspect, and the third possible implementation manner of the first aspect, in a fourth possible implementation manner of the first aspect, the filter further includes a demultiplexer configured to filter the OFDM signal in the receiving device; and the center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

A second aspect of the embodiments of the present invention provides a transmitter, including: a receiving module, configured to receive a frequency offset value, where the frequency offset value is used to indicate a degree and a direction that are of a difference that is between a center frequency of a filter and a center frequency of a laser configured to transmit the OFDM signal in the transmitter and that deviates from a first threshold, the filter includes a multiplexer configured to filter the OFDM signal in the transmitter, and the first threshold is a difference between a center frequency of the laser and a center frequency of the filter when a bit error rate of the OFDM signal is lowest; and a correction module, configured to correct the difference between the center frequency of the laser and the center frequency of the filter according to the frequency offset value.

In a first possible implementation manner of the second aspect, the correction module includes: a first correction unit, configured to: if the frequency offset value indicates that the difference between the center frequency of the filter and the center frequency of the laser deviates from the first threshold towards a difference increasing direction, adjust the center frequency of the laser towards a difference decreasing direction, where an adjustment amplitude is equal to an absolute value of the frequency offset value; and a second correction unit, configured to: if the frequency offset value indicates that the difference between the center frequency of the filter and the center frequency of the laser deviates from the first threshold towards a difference decreasing direction, adjust the center frequency of the laser towards a difference increasing direction, where an adjustment amplitude is equal to an absolute value of the frequency offset value.

With reference to the first possible implementation manner of the second aspect, in a second possible implementation manner of the second aspect, the frequency offset value $y=(v_1-v_2)-\Delta$, $v_1$ is the center frequency of the filter, $v_2$ is the center frequency of the laser, and $\Delta$ is the first threshold; and the correction module further includes: a judging unit, configured to: when the frequency offset value is $-S$, determine that the difference $(v_1-v_2)$ between the center frequency of the filter and the center frequency of the laser deviates from the first threshold towards the difference decreasing direction; or when the frequency offset value is $+S$, determine that the difference $(v_1-v_2)$ between the center frequency of the filter and the center frequency of the laser deviates from the first threshold towards the difference increasing direction; where a value range of S is a positive number.

With reference to the second aspect, the first possible implementation manner of the second aspect, and the second possible implementation manner of the second aspect, in a third possible implementation manner of the second aspect, the filter further includes a demultiplexer configured to filter the OFDM signal in the receiving device; and the center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

A third aspect of the embodiments of the present invention provides a receiving device, including: a detector, configured to detect a power parameter of a pilot in a received orthogonal frequency division multiplexing OFDM signal; a memory, configured to store a program; a processor, configured to execute the program stored in the memory, so as to determine a frequency offset value according to the power parameter of the pilot, where the frequency offset value is used to indicate a degree and a direction that are of a difference that is between a center frequency of a laser configured to transmit the OFDM signal in a transmitter and a center frequency of a filter and that deviates from a first threshold, the filter includes a multiplexer configured to filter the OFDM signal in the transmitter, and the first threshold is a difference between a center frequency of the filter and a center frequency of the laser when a bit error rate of the OFDM signal is lowest; and a communications interface, configured to send the frequency offset value.

In a first possible implementation manner of the third aspect, the processor is specifically configured to perform calculation according to a linear correspondence between the predetermined power parameter p of the pilot and the frequency offset value y, so as to obtain the frequency offset value $y=kp+c$, where k and c are constants obtained by testing the linear correspondence between the power parameter p of the pilot and the frequency offset value $y=(v_1-v_2)-\Delta$ in a manner in which the center frequency $v_1$ of the filter remains unchanged and the center frequency $v_2$ of the laser is shifted, and $\Delta$ is the first threshold; or the processor is specifically configured to compare the power parameter p of the pilot that is obtained by means of detection with a second threshold $P_0$, where the second threshold is a power parameter of the pilot that is detected when the difference between the center frequency of the filter and the center frequency of the laser is equal to the first threshold; and if the power parameter p of the pilot is greater than the second threshold $P_0$, determine that the frequency offset value is $+S$; or if the power parameter p of the pilot is less than the second threshold $P_0$, determine that the frequency offset value is $-S$; where S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

A fourth aspect of the embodiments of the present invention provides a transmitter, including: a communications interface, configured to receive a frequency offset value, where the frequency offset value is used to indicate a degree and a direction that are of a difference that is between a center frequency of a laser configured to transmit an OFDM signal in the transmitter and a center frequency of a filter and that deviates from a first threshold, the filter includes a multiplexer configured to filter the OFDM signal in the transmitter, and the first threshold is a difference between a center frequency of the laser and a center frequency of the filter when a bit error rate of the OFDM signal is lowest; a memory, configured to store a program; and a processor, configured to execute the program stored in the memory, so as to correct the difference between the center frequency of the filter and the center frequency of the laser according to the frequency offset value.

In a first possible implementation manner of the fourth aspect, the processor is specifically configured to: if the frequency offset value indicates that the difference between the center frequency of the filter and the center frequency of the laser deviates from the first threshold towards a difference increasing direction, adjust the center frequency of the laser towards a difference decreasing direction, where an adjustment amplitude is equal to an absolute value of the frequency offset value; or if the frequency offset value indicates that the difference between the center frequency of the filter and the center frequency of the laser deviates from the first threshold towards a difference decreasing direction, adjust the center frequency of the laser towards a difference increasing direction, where an adjustment amplitude is equal to an absolute value of the frequency offset value.

With reference to the first possible implementation manner of the fourth aspect, in a second possible implementation manner of the fourth aspect, the frequency offset value $y=(v_1-v_2)-\Delta$, $v_1$ is the center frequency of the filter, $v_2$ is the center frequency of the laser, and $\Delta$ is the first threshold; and the processor is further configured to: when the frequency offset value is $-S$, determine that the difference $(v_1-v_2)$ between the center frequency of the filter and the center frequency of the laser deviates from the first threshold towards the difference decreasing direction; or when the frequency offset value is $+S$, determine that the difference $(v_1-v_2)$ between the center frequency of the filter and the center frequency of the laser deviates from the first threshold towards the difference increasing direction; where a value range of S is a positive number.

A fifth aspect of the embodiments of the present invention provides a frequency offset correction method, including: detecting a power parameter of a pilot in a received orthogonal frequency division multiplexing OFDM signal; determining a frequency offset value according to the power parameter of the pilot, where the frequency offset value is used to indicate a degree and a direction that are of a difference that is between a center frequency of a laser configured to transmit the OFDM signal in a transmitter and a center frequency of a filter and that deviates from a first threshold, the filter includes a multiplexer configured to filter the OFDM signal in the transmitter, and the first threshold is a difference between a center frequency of the filter and a center frequency of the laser when a bit error rate of the OFDM signal is lowest; and sending the frequency offset value.

In a second possible implementation manner of the fifth aspect, the determining a frequency offset value according to the power parameter of the pilot includes: performing calculation according to a linear correspondence between the predetermined power parameter p of the pilot and the frequency offset value y, so as to obtain the frequency offset value $y=kp+c$, where k and c are constants obtained by testing the linear correspondence between the power parameter p of the pilot and the frequency offset value $y=(v_1-v_2)-\Delta$ in a manner in which the center frequency $v_1$ of the filter remains unchanged and the center frequency $v_2$ of the laser is shifted, and $\Delta$ is the first threshold; or the determining a frequency offset value according to the power parameter of the pilot includes: comparing the power parameter p of the pilot that is obtained by means of detection with a second threshold $P_0$, where the second threshold is a power parameter of the pilot that is detected when the difference between the center frequency of the filter and the center frequency of the laser is equal to the first threshold; and if the power parameter p of the pilot is greater than the second threshold $P_0$, determining that the frequency offset value is $+S$; or if the power parameter p of the pilot is less than the second threshold $P_0$, determining that the frequency offset value is $-S$; where S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

A sixth aspect of the embodiments of the present invention provides a frequency offset correction method, including: receiving a frequency offset value, where the frequency offset value is used to indicate a degree and a direction that are of a difference that is between a center frequency of a laser configured to transmit an OFDM signal in a transmitter and a center frequency of a filter and that deviates from a first threshold, the filter includes a multiplexer configured to filter the OFDM signal in the transmitter, and the first threshold is a difference between a center frequency of the filter and a center frequency of the laser when a bit error rate of the OFDM signal is lowest; and correcting the difference between the center frequency of the filter and the center frequency of the laser according to the frequency offset value.

In a first possible implementation manner of the sixth aspect, the correcting the difference between the center frequency of the filter and the center frequency of the laser according to the frequency offset value includes: if the frequency offset value indicates that the difference between the center frequency of the filter and the center frequency of the laser deviates from the first threshold towards a difference increasing direction, adjusting the center frequency of the laser towards a difference decreasing direction, where an adjustment amplitude is equal to an absolute value of the frequency offset value; or if the frequency offset value indicates that the difference between the center frequency of the filter and the center frequency of the laser deviates from the first threshold towards a difference decreasing direction, adjusting the center frequency of the laser towards a difference increasing direction, where an adjustment amplitude is equal to an absolute value of the frequency offset value.

With reference to the first possible implementation manner of the sixth aspect, in a second possible implementation manner of the sixth aspect, the frequency offset value $y=(v_1-v_2)-\Delta$, $v_1$ is the center frequency of the filter, $v_2$ is the center frequency of the laser, and $\Delta$ is the first threshold; and before the adjusting the center frequency of the laser towards a difference decreasing direction, where an adjustment amplitude is equal to an absolute value of the frequency offset value, the method further includes: when the frequency offset value is $-S$, determining that the difference $(v_1-v_2)$ between the center frequency of the filter and the center frequency of the laser deviates from the first threshold towards the difference decreasing direction, where a value range of S is a positive number; or before the adjusting the center frequency of the laser towards a difference increasing direction, where an adjustment amplitude is equal to an absolute value of the frequency offset value, the method further includes: when the frequency offset value is $+S$, determining that the difference $(v_1-v_2)$ between the center frequency of the filter and the center frequency of the laser deviates from the first threshold towards the difference increasing direction, where a value range of S is a positive number.

According to the transmitter, the receiving device, and the frequency offset correction method that are provided in the embodiments of the present invention, after a power parameter of a pilot in an OFDM signal received by a receiving device is detected, a frequency offset value used to indicate a degree and a direction that are of a difference that is between a center frequency of a filter and a center frequency of a laser and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
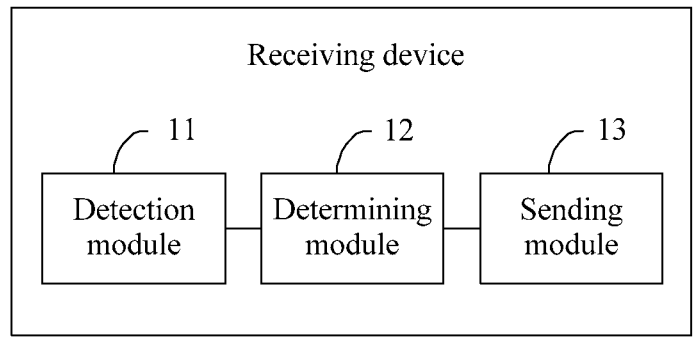
FIG. 1 is a schematic structural diagram of a receiving device according to an embodiment of the present invention.

FIG. 1 is a schematic structural diagram of a receiving device according to an embodiment of the present invention. The receiving device in this embodiment is configured to receive an OFDM signal, and is disposed in an OFDM system. The OFDM system further includes a transmitter configured to send the OFDM signal. As shown in FIG. 1, the receiving device includes a detection module 11, a determining module 12, and a sending module 13.

The detection module 11 is configured to detect a power parameter of a pilot in the received OFDM signal.

The power parameter of the pilot includes a difference between power of a low frequency pilot and power of a high frequency pilot, and at least one of the power of the low frequency pilot or the power of the high frequency pilot, where a frequency of a subcarrier used to carry the low frequency pilot is lower than a frequency of a subcarrier used to carry the high frequency pilot.

Optionally, the detection module 11 is specifically configured to: collect the OFDM signal received by the receiving device, so as to obtain a sample signal; perform fast Fourier transformation on the sample signal, so as to obtain the pilot in the OFDM signal; and obtain the power parameter of the pilot by means of detection.

The determining module 12 is connected to the detection module 11, and is configured to determine a frequency offset value according to the power parameter of the pilot.

The frequency offset value is used to indicate a degree and a direction that are of a difference that is between a center frequency of a filter and a center frequency of a laser configured to transmit the OFDM signal in the transmitter and that deviates from a first threshold, the filter includes a multiplexer configured to filter the OFDM signal in the transmitter, and the first threshold is a difference between a center frequency of the laser and a center frequency of the filter when a bit error rate of the OFDM signal is lowest.

Optionally, the determining module 12 is specifically configured to perform calculation according to a linear correspondence between the predetermined power parameter p of the pilot and the frequency offset value y, so as to obtain the frequency offset value $y=kp+c$, where k and c are constants obtained by testing the linear correspondence between the power parameter p of the pilot and the frequency offset value $y=(v_1-v_2)-\Delta$ in a manner in which the center frequency $v_1$ of the filter remains unchanged and the center frequency $v_2$ of the laser is shifted, and $\Delta$ is the first threshold.

Optionally, the determining module 12 is specifically configured to compare the power parameter p of the pilot that is obtained by means of detection with a second threshold $P_0$, where the second threshold is a power parameter of the pilot that is detected when the difference between the center frequency of the filter and the center frequency of the laser is equal to the first threshold; and if the power parameter p of the pilot is greater than the second threshold $P_0$, determine that the frequency offset value is +S; or if the power parameter p of the pilot is less than the second threshold $P_0$, determine that the frequency offset value is −S; where S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

The sending module 13 is configured to send the frequency offset value.

Optionally, the sending module 13 sends the frequency offset value by using an auto-negotiation data packet, so that the receiving device corrects the difference between the center frequency of the laser and the center frequency of the filter according to the determined frequency offset value.

Based on that the receiving device further includes a demultiplexer, the foregoing filter further includes the demultiplexer configured to filter the OFDM signal in the receiving device. The center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

In this embodiment of the present invention, after a power parameter of a pilot in an OFDM signal received by a receiving device is detected, a frequency offset value used to indicate a degree and a direction that are of a difference that is between a center frequency of a filter and a center frequency of a laser and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

Figure 2:
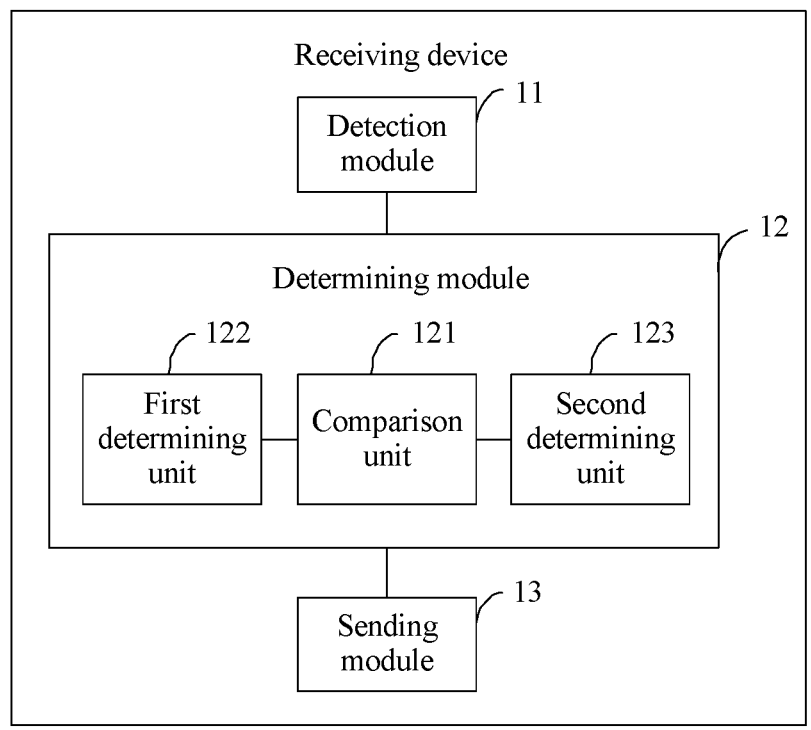
FIG. 2 is a schematic structural diagram of another receiving device according to an embodiment of the present invention.

FIG. 2 is a schematic structural diagram of another receiving device according to an embodiment of the present invention. The receiving device in this embodiment is based on the foregoing embodiment, and the determining module 12 further includes a comparison unit 121, a first determining unit 122, and a second determining unit 123.

The comparison unit 121 is configured to compare the power parameter p of the pilot that is obtained by means of detection with the second threshold $P_0$.

The second threshold is the power parameter of the pilot that is detected when the difference between the center frequency of the filter and the center frequency of the laser is equal to the first threshold.

The first determining unit 122 is connected to the comparison unit 121, and is configured to: if the power parameter p of the pilot is greater than the second threshold $P_0$, determine that the frequency offset value is +S.

S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

The second determining unit 123 is connected to the comparison unit 121, and is configured to: if the power parameter p of the pilot is less than the second threshold $P_0$, determine that the frequency offset value is −S.

S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

In this embodiment of the present invention, after a power parameter of a pilot in an OFDM signal received by a receiving device is detected, a frequency offset value used to indicate a degree and a direction that are of a difference that is between a center frequency of a laser and a center frequency of a filter and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

Figure 3:
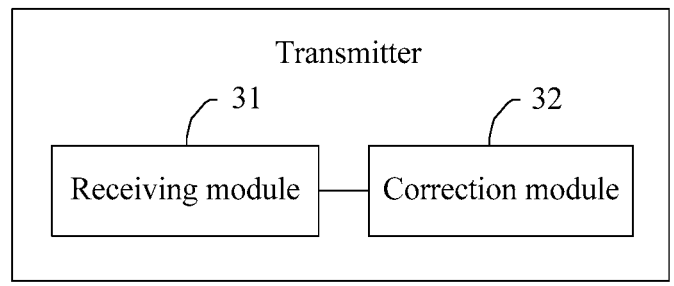
FIG. 3 is a schematic structural diagram of a transmitter according to an embodiment of the present invention.

FIG. 3 is a schematic structural diagram of a transmitter according to an embodiment of the present invention. The transmitter in this embodiment is configured to send an OFDM signal, and is disposed in an OFDM system. The OFDM system further includes a receiving device configured to receive the OFDM signal. As shown in FIG. 3, the transmitter includes a receiving module 31 and a correction module 32.

The receiving module 31 is configured to receive a frequency offset value.

The frequency offset value is used to indicate a degree and a direction that are of a difference that is between a center frequency of a filter and a center frequency of a laser configured to transmit the OFDM signal in the transmitter and that deviates from a first threshold, the filter includes a multiplexer configured to filter the OFDM signal in the transmitter, and the first threshold is set according to a bit error rate of the OFDM signal, specifically, the first threshold is a difference between a center frequency of the laser and a center frequency of the filter when the bit error rate of the OFDM signal is lowest.

The correction module 32 is configured to correct the difference between the center frequency of the laser and the center frequency of the filter according to the frequency offset value.

Optionally, the correction module 32 is specifically configured to: if the frequency offset value indicates that the difference between the center frequency of the filter and the center frequency of the laser deviates from the first threshold towards a difference increasing direction, adjust the center frequency of the laser towards a difference decreasing direction, where an adjustment amplitude is equal to an absolute value of the frequency offset value; or if the frequency offset value indicates that the difference between the center frequency of the filter and the center frequency of the laser deviates from the first threshold towards a difference decreasing direction, adjust the center frequency of the laser towards a difference increasing direction, where an adjustment amplitude is equal to an absolute value of the frequency offset value.

Based on the frequency offset value $y=(v_1-v_2)-\Delta$ where $v_1$ is the center frequency of the filter, $v_2$ is the center frequency of the laser, and $\Delta$ is the first threshold, the correction module 32 is further configured to: when the frequency offset value is −S, determine that the difference ($v_1-v_2$) between the center frequency of the filter and the center frequency of the laser deviates from the first threshold towards the difference decreasing direction; or when the frequency offset value is +S, determine that the difference ($v_1-v_2$) between the center frequency of the filter and the center frequency of the laser deviates from the first threshold towards the difference increasing direction; where a value range of S is a positive number.

It should be noted that, if the receiving device further includes a demultiplexer configured to filter the OFDM signal, the filter further includes the demultiplexer. The center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

In this embodiment of the present invention, after a power parameter of a pilot in an OFDM signal received by a receiving device is detected, a frequency offset value used to indicate a degree and a direction that are of a difference that is between a center frequency of a laser and a center frequency of a filter and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

Figure 4A:
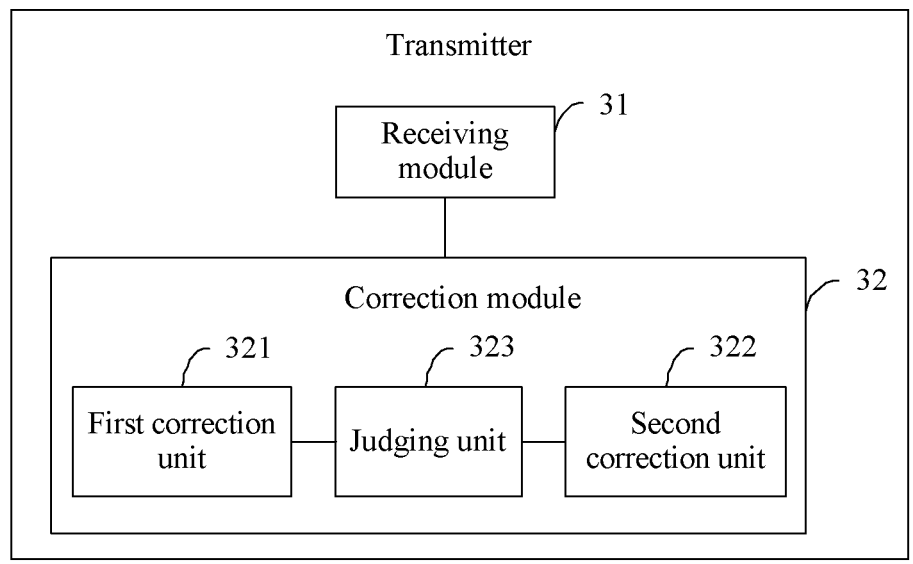
FIG. 4A is a schematic structural diagram of another transmitter according to an embodiment of the present invention.

FIG. 4A is a schematic structural diagram of another transmitter according to an embodiment of the present invention. As shown in FIG. 4A, based on the foregoing embodiment, the correction module 32 includes a first correction unit 321 and a second correction unit 322.

The first correction unit 321 is configured to: if the frequency offset value indicates that the difference between the center frequency of the filter and the center frequency of the laser deviates from the first threshold towards the difference increasing direction, adjust the center frequency of the laser towards the difference decreasing direction, where the adjustment amplitude is equal to the absolute value of the frequency offset value.

The second correction unit 322 is configured to: if the frequency offset value indicates that the difference between the center frequency of the filter and the center frequency of the laser deviates from the first threshold towards the difference decreasing direction, adjust the center frequency of the laser towards the difference increasing direction, where the adjustment amplitude is equal to the absolute value of the frequency offset value.

Based on the frequency offset value $y=(v_1-v_2)-\Delta$, where $v_1$ is the center frequency of the filter, $v_2$ is the center frequency of the laser, and $\Delta$ is the first threshold, the correction module 32 further includes:

a judging unit 323, configured to: when the frequency offset value is −S, determine that the difference ($v_1-v_2$) between the center frequency of the filter and the center frequency of the laser deviates from the first threshold towards the difference decreasing direction; or when the frequency offset value is +S, determine that the difference ($v_1-v_2$) between the center frequency of the filter and the center frequency of the laser deviates from the first threshold towards the difference increasing direction; where a value range of S is a positive number.

Based on this, the first correction unit 321 is specifically configured to: if the frequency offset value indicates that the difference between the center frequency of the filter and the center frequency of the laser deviates from the first threshold towards the difference increasing direction, adjust the center frequency of the laser towards a center frequency increasing direction, where an adjustment amplitude is equal to an absolute value of the frequency offset value.

The second correction unit 322 is configured to: if the frequency offset value indicates that the difference between the center frequency of the filter and the center frequency of the laser deviates from the first threshold towards the difference decreasing direction, adjust the center frequency of the laser towards a center frequency decreasing direction, where an adjustment amplitude is equal to an absolute value of the frequency offset value.

Figure 4B:
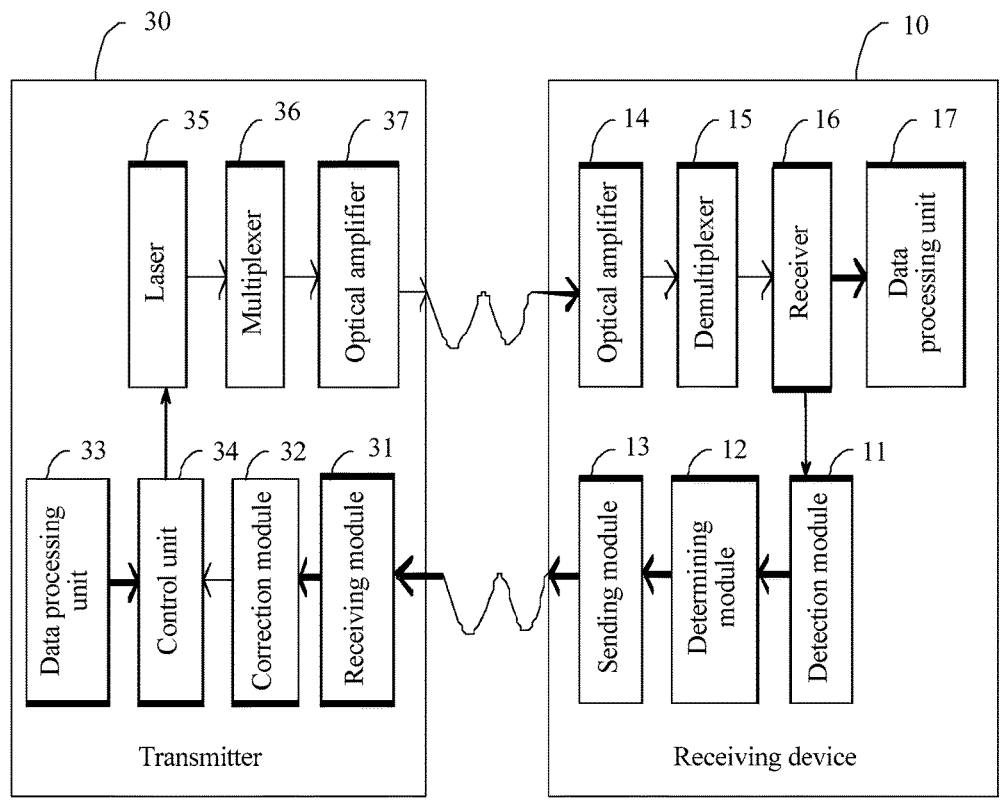
FIG. 4B is a schematic diagram of an OFDM system according to an embodiment of the present invention.

To clearly describe this embodiment of the present invention, this embodiment of the present invention further provides an OFDM system. FIG. 4B is a schematic structural diagram of the OFDM system according to this embodiment of the present invention. As shown in FIG. 4B, the OFDM system includes a transmitter 30, a receiving device 10, and a fiber used to connect the transmitter 30 and the receiving device 10, where the receiving device 10 includes each function module in the receiving device shown in FIG. 1, including the detection module 11, the determining module 12, and the sending module 13, and the transmitter 30 includes each function module in the transmitter shown in FIG. 3, including the receiving module 31 and the correction module 32. For a function of each function module, reference may be made to the description in corresponding embodiments, and details are not described in this embodiment.

Further, as shown in FIG. 4B, in addition to including the foregoing function modules, that is, the detection module 11, the determining module 12, and the sending module 13, the receiving device 10 may further include an optical amplifier 14, a demultiplexer 15, a receiver 16, and a data processing unit 17.

The optical amplifier 14 is configured to perform optical power amplification processing on an optical carrier that carries the OFDM signal.

The demultiplexer 15 is connected to the optical amplifier 14, and is configured to: when at least two optical carriers carry the OFDM signal, perform demultiplexing on the optical carriers that carry the OFDM signal and on which the optical power amplification processing is performed, so as to obtain each single optical carrier that carries the OFDM signal.

The receiver 16 is connected to the detection module 11 and the demultiplexer 15, and is configured to obtain the OFDM signal according to the single optical carrier that carries the OFDM signal.

The data processing unit 17 is connected to the receiver 16, and is configured to perform data processing on the OFDM signal, so as to obtain data information.

Further, as shown in FIG. 4B, in addition to including the foregoing function modules, that is, the receiving module 31 and the correction module 32, the transmitter 30 may further include a data processing unit 33, a control unit 34, a laser 35, a multiplexer 36, and an optical amplifier 37.

The data processing unit 33 is configured to generate the OFDM signal according to the to-be-sent data information.

The control unit 34 is connected to the data processing unit 33 and the correction module 32, and is configured to: send the OFDM signal generated by the data processing unit 33, and adjust an operating temperature of the laser, so as to implement control of the center frequency of the laser.

Optionally, the control unit 34 adjusts operating parameters such as the temperature of the laser according to that the center frequency of the laser is adjusted towards the difference increasing direction, where the adjustment amplitude is equal to the absolute value of the frequency offset value, or that the center frequency of the laser is adjusted towards the difference decreasing direction, where the adjustment amplitude is equal to the absolute value of the frequency offset value determined by the correction module 32. Specifically, based on the frequency offset value $y=(v_1-v_2)-\Delta$ where $v_1$ is the center frequency of the filter, $v_2$ is the center frequency of the laser, and $\Delta$ is the first threshold, the control unit 34 is specifically configured to: if the correction module 32 determines that the center frequency of the laser is adjusted towards the center frequency increasing direction, reduce the operating temperature of the laser; or if the correction module 32 determines that the center frequency of the laser is adjusted towards the center frequency decreasing direction, increase the operating temperature of the laser.

Figure 4C:
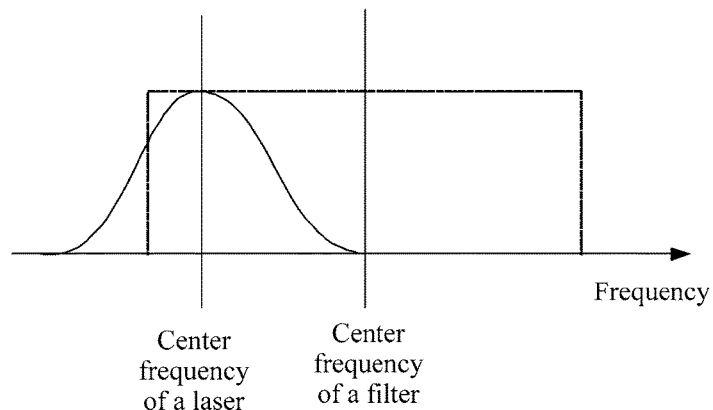
FIG. 4C is a schematic diagram of center frequencies of a laser and a filter when a bit error rate of an OFDM system reaches a minimum value.

FIG. 4C is a schematic diagram of center frequencies of the laser and the filter when a bit error rate of the OFDM system reaches a minimum value. As shown in FIG. 4C, a dotted line box is a filtering window of the filter, a solid curve is a frequency curve of the laser, and the center frequency of the filter is greater than the center frequency of the laser, that is, the first threshold his greater than zero.

The laser 35 is connected to the control unit 34, and is configured to: transmit the OFDM signal carried by the optical carrier, and correct the center frequency of the laser under the control of the control unit 34.

The multiplexer 36 is connected to the laser 35, and is configured to: perform filtering processing on the OFDM signal carried by the optical carrier, and if there are at least two lasers 35, perform multiplexing processing on the OFDM signal that is carried by the optical carrier and that is transmitted by the at least two lasers 35.

The optical amplifier 37 is connected to the multiplexer 36, and is configured to perform optical power amplification processing on the optical carrier that carries the OFDM signal and on which the multiplexing processing is performed.

In this embodiment of the present invention, after a power parameter of a pilot in an OFDM signal received by a receiving device is detected, a frequency offset value used to indicate a degree and a direction that are of a difference that is between a center frequency of a laser and a center frequency of a filter and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

Figure 5:
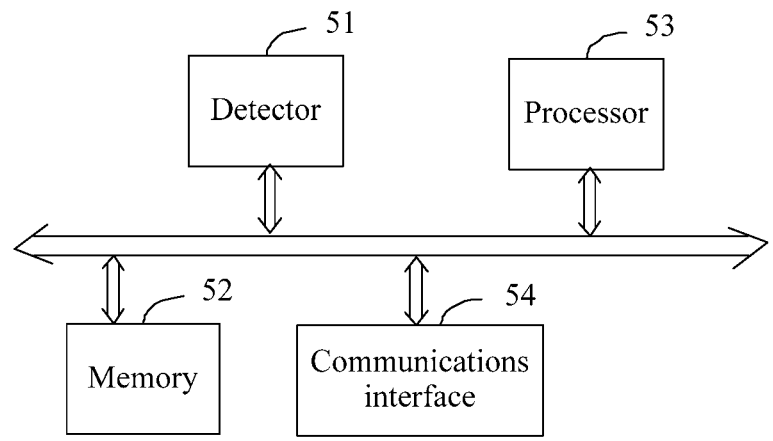
FIG. 5 is a schematic structural diagram of a receiving device according to another embodiment of the present invention.

FIG. 5 is a schematic structural diagram of a receiving device according to another embodiment of the present invention. As shown in FIG. 5, the receiving device includes a detector 51, a memory 52, a processor 53, and a communications interface 54.

The detector 51 is configured to detect a power parameter of a pilot in a received OFDM signal.

The power parameter of the pilot includes a difference between power of a low frequency pilot and power of a high frequency pilot, and at least one of the power of the low frequency pilot or the power of the high frequency pilot, where a frequency of a subcarrier used to carry the low frequency pilot is lower than a frequency of a subcarrier used to carry the high frequency pilot.

Optionally, the detector 51 is specifically configured to: collect the OFDM signal, so as to obtain a sample signal; perform fast Fourier transformation on the sample signal, so as to obtain the pilot in the OFDM signal; and detect the power parameter of the pilot.

The memory 52 is configured to store a program. Specifically, the program may include program code, where the program code includes a computer operation instruction. The memory 52 may include a high-speed RAM memory, and may further include a non-volatile memory (non-volatile memory), for example, at least one disk memory.

The processor 53 is configured to execute the program stored in the memory, so as to determine a frequency offset value according to the power parameter of the pilot.

The frequency offset value is used to indicate a degree and a direction that are of a difference that is between a center frequency of a laser configured to transmit the OFDM signal in a transmitter and a center frequency of a filter and that deviates from a first threshold, the filter includes a multiplexer configured to filter the OFDM signal in the transmitter, and the first threshold is a difference between a center frequency of the filter and a center frequency of the laser when a bit error rate of the OFDM signal is lowest.

It should be noted that, if the receiving device further includes a demultiplexer configured to filter the OFDM signal, the filter further includes the demultiplexer. The center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

Optionally, the processor 53 is specifically configured to perform calculation according to a linear correspondence between the predetermined power parameter p of the pilot and the frequency offset value y, so as to obtain the frequency offset value $y=kp+c$.

K and c are constants obtained by testing the linear correspondence between the power parameter p of the pilot and the frequency offset value $y=(v_1-v_2)-\Delta$ in a manner in which the center frequency $v_1$ of the filter remains unchanged and the center frequency $v_2$ of the laser is shifted, and $\Delta$ is the first threshold.

Optionally, the processor 53 is specifically configured to compare the power parameter p of the pilot that is obtained by means of detection with a second threshold $P_0$, where the second threshold is a power parameter of the pilot that is detected when the difference between the center frequency of the filter and the center frequency of the laser is equal to the first threshold; and if the power parameter p of the pilot is greater than the second threshold $P_0$, determine that the frequency offset value is +S; or if the power parameter p of the pilot is less than the second threshold $P_0$, determine that the frequency offset value is −S.

S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

The communications interface 54 is configured to send the frequency offset value to the transmitter.

Optionally, the communications interface 54 is specifically configured to send the frequency offset value to the transmitter by using an auto-negotiation data packet, so that the transmitter corrects the difference between the center frequency of the laser and the center frequency of the filter according to the frequency offset value.

Optionally, in specific implementation, if the detector 51, the memory 52, the processor 53, and the communications interface 54 are implemented independently of each other, the detector 51, the memory 52, the processor 53, and the communications interface 54 may be interconnected and complete mutual communication by using a bus. The bus may be an Industry Standard Architecture (Industry Standard Architecture, ISA for short) bus, a Peripheral Component Interconnect (Peripheral Component, PCI for short) bus, an Extended Industry Standard Architecture (Extended Industry Standard Architecture, EISA for short) bus, or the like. The bus may be classified into an address bus, a data bus, a control bus, and the like. For ease of illustration, only one bold line is used in FIG. 5 to represent the bus. However, this does not mean that there is only one bus or only one type of bus.

Optionally, in specific implementation, if the detector 51, the memory 52, the processor 53, and the communications interface 54 are integrated into a chip for implementation, the detector 51, the memory 52, the processor 53, and the communications interface 54 may complete mutual communication by using an internal interface.

In this embodiment of the present invention, after a power parameter of a pilot in an OFDM signal received by a receiving device is detected, a frequency offset value used to indicate a degree and a direction that are of a difference that is between a center frequency of a laser and a center frequency of a filter and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

Figure 6:
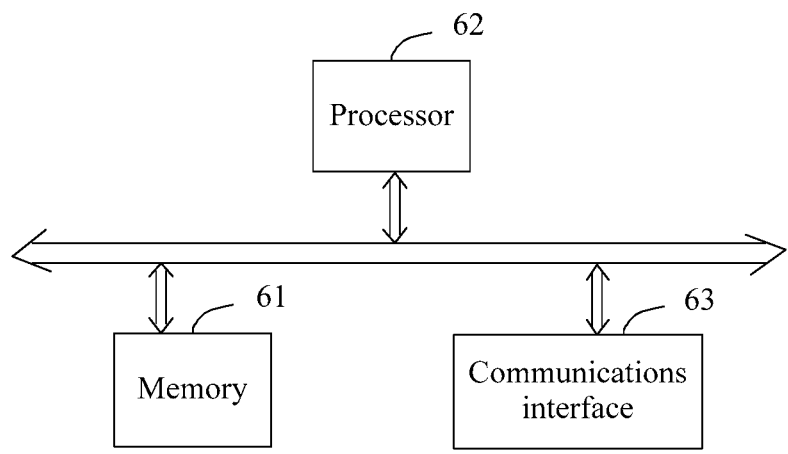
FIG. 6 is a schematic structural diagram of a transmitter according to another embodiment of the present invention.

FIG. 6 is a schematic structural diagram of a transmitter according to another embodiment of the present invention. As shown in FIG. 6, the transmitter includes a memory 61, a processor 62, and a communications interface 63.

The communications interface 63 is configured to receive a frequency offset value sent by a receiving device.

The frequency offset value is used to indicate a degree and a direction that are of a difference that is between a center frequency of a laser configured to transmit an OFDM signal in the transmitter and a center frequency of a filter and that deviates from a first threshold, the filter includes a multiplexer configured to filter the OFDM signal in the transmitter, and the first threshold is a difference between a center frequency of the filter and a center frequency of the laser when a bit error rate of the OFDM signal is lowest.

Optionally, the communications interface 63 is specifically configured to receive the frequency offset value sent by the receiving device by using an auto-negotiation data packet.

The memory 61 is configured to store a program. Specifically, the program may include program code, where the program code includes a computer operation instruction. The memory 61 may include a high-speed RAM memory, and may further include a non-volatile memory (non-volatile memory), for example, at least one disk memory.

The processor 62 is configured to execute the program stored in the memory, so as to correct the difference between the center frequency of the filter and the center frequency of the laser according to the frequency offset value.

Optionally, the processor 62 is specifically configured to: if the frequency offset value indicates that the difference between the center frequency of the filter and the center frequency of the laser deviates from the first threshold towards a difference increasing direction, adjust the center frequency of the laser towards a difference decreasing direction, where an adjustment amplitude is equal to an absolute value of the frequency offset value; or if the frequency offset value indicates that the difference between the center frequency of the filter and the center frequency of the laser deviates from the first threshold towards a difference decreasing direction, adjust the center frequency of the laser towards a difference increasing direction, where an adjustment amplitude is equal to an absolute value of the frequency offset value.

Further, based on the frequency offset value $y=(v_1-v_2)-\Delta$ where $v_1$ is the center frequency of the filter, $v_2$ is the center frequency of the laser, and $\Delta$ is the first threshold, the processor is further configured to: when the frequency offset value is $-S$, determine that the difference $(v_1-v_2)$ between the center frequency of the filter and the center frequency of the laser deviates from the first threshold towards the difference decreasing direction; or when the frequency offset value is $+S$, determine that the difference $(v_1-v_2)$ between the center frequency of the filter and the center frequency of the laser deviates from the first threshold towards the difference increasing direction; where a value range of S is a positive number.

Optionally, the processor 62 is specifically configured to: if the frequency offset value indicates that the difference between the center frequency of the filter and the center frequency of the laser deviates from the first threshold towards the difference increasing direction, adjust the center frequency of the laser towards a center frequency increasing direction, where an adjustment amplitude is equal to an absolute value of the frequency offset value; or if the frequency offset value indicates that the difference between the center frequency of the filter and the center frequency of the laser deviates from the first threshold towards the difference decreasing direction, adjust the center frequency of the laser towards a center frequency decreasing direction, where an adjustment amplitude is equal to an absolute value of the frequency offset value.

It should be noted that, if the receiving device further includes a demultiplexer configured to filter the OFDM signal, the filter further includes the demultiplexer. The center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

Optionally, in specific implementation, if the memory 61, the processor 62, and the communications interface 63 are implemented independently of each other, the memory 61, the processor 62, and the communications interface 63 may be interconnected and complete mutual communication by using a bus. The bus may be an Industry Standard Architecture (Industry Standard Architecture, ISA for short) bus, a Peripheral Component Interconnect (Peripheral Component, PCI for short) bus, an Extended Industry Standard Architecture (Extended Industry Standard Architecture, EISA for short) bus, or the like. The bus may be classified into an address bus, a data bus, a control bus, and the like. For ease of illustration, only one bold line is used in FIG. 6 to represent the bus. However, this does not mean that there is only one bus or only one type of bus.

Optionally, in specific implementation, if the memory 61, the processor 62, and the communications interface 63 are integrated into a chip for implementation, the memory 61, the processor 62, and the communications interface 63 may complete mutual communication by using an internal interface.

In this embodiment of the present invention, after a power parameter of a pilot in an OFDM signal received by a receiving device is detected, a frequency offset value used to indicate a degree and a direction that are of a difference that is between a center frequency of a laser and a center frequency of a filter and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

Figure 7:
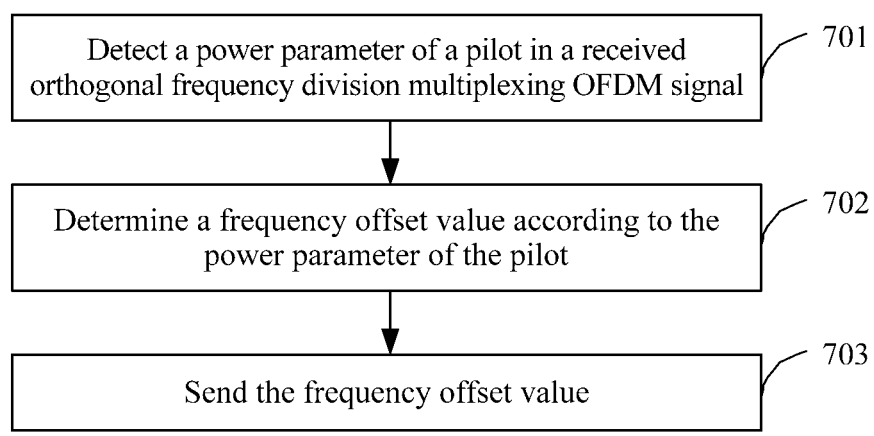
FIG. 7 is a schematic flowchart of a frequency offset correction method according to an embodiment of the present invention.

FIG. 7 is a schematic flowchart of a frequency offset correction method according to an embodiment of the present invention. The method provided in this embodiment may be executed by a receiving device configured to receive an OFDM signal in an OFDM system. The OFDM system further includes a transmitter configured to send the OFDM signal. As shown in FIG. 7, the method includes:

701. Detect a power parameter of a pilot in a received orthogonal frequency division multiplexing OFDM signal.

The power parameter of the pilot includes a difference between power of a low frequency pilot and power of a high frequency pilot, and at least one of the power of the low frequency pilot or the power of the high frequency pilot, where a frequency of a subcarrier used to carry the low frequency pilot is lower than a frequency of a subcarrier used to carry the high frequency pilot.

Optionally, the OFDM signal received by the receiving device is collected, so as to obtain a sample signal; fast Fourier transformation is performed on the sample signal, so as to obtain the pilot in the OFDM signal; and the power parameter of the pilot is detected.

702. Determine a frequency offset value according to the power parameter of the pilot.

The frequency offset value is used to indicate a degree and a direction that are of a difference that is between a center frequency of a laser configured to transmit the OFDM signal in the transmitter and a center frequency of a filter and that deviates from a first threshold, the filter includes a multiplexer configured to filter the OFDM signal in the transmitter, and the first threshold is a difference between a center frequency of the filter and a center frequency of the laser when a bit error rate of the OFDM signal is lowest.

Optionally, the power parameter p of the pilot that is obtained by means of detection is compared with a second threshold $P_0$, where the second threshold is a power parameter of the pilot that is detected when the difference between the center frequency of the filter and the center frequency of the laser is equal to the first threshold; and if the power parameter p of the pilot is greater than the second threshold $P_0$, that the frequency offset value is +S is determined; or if the power parameter p of the pilot is less than the second threshold $P_0$, that the frequency offset value is −S is determined; where S is a preset constant, a value range of S is a positive number, and S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

Optionally, calculation is performed according to a linear correspondence between the predetermined power parameter p of the pilot and the frequency offset value y, so as to obtain the frequency offset value y=kp+c, where k and c are constants obtained by testing the linear correspondence between the power parameter p of the pilot and the frequency offset value $y=(v_1-v_2)-\Delta$ in a manner in which the center frequency $v_1$ of the filter remains unchanged and the center frequency $v_2$ of the laser is shifted, and $\Delta$ is the first threshold.

Further, before step 702, the linear correspondence y=kp+c between the power parameter p of the pilot and the frequency offset value y is predetermined. Specifically, the center frequency of the filter in the OFDM system remains stable, and the difference between the center frequency of the filter and the center frequency of the laser is equal to the first threshold. The center frequency of the laser is adjusted towards a frequency increasing direction and a frequency decreasing direction respectively at a preset step S, and a maximum adjustment amplitude is THD Hz. A direction and an amplitude that are of adjusting the center frequency of the laser are recorded as y, a power parameter p of the pilot that is corresponding to each y value is detected, and linear fitting is performed, so as to obtain the linear correspondence y=kp+c between the power parameter p of the pilot and the frequency offset value y, where $P_1<p<P_h$, $P_h$ and $P_1$ are maximum value $P_h$ and minimum value $P_1$ that are of the power parameter p of the pilot and that are detected when the linear correspondence is determined.

It should be noted that, if the receiving device further includes a demultiplexer configured to filter the OFDM signal, the filter further includes the demultiplexer. The center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

703. Send the frequency offset value.

Optionally, the frequency offset value is sent by using an auto-negotiation data packet, so that the transmitter corrects the difference between the center frequency of the laser and the center frequency of the filter according to the frequency offset value.

In this embodiment of the present invention, after a power parameter of a pilot in an OFDM signal received by a receiving device is detected, a frequency offset value used to indicate a degree and a direction that are of a difference that is between a center frequency of a laser and a center frequency of a filter and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

Figure 8:
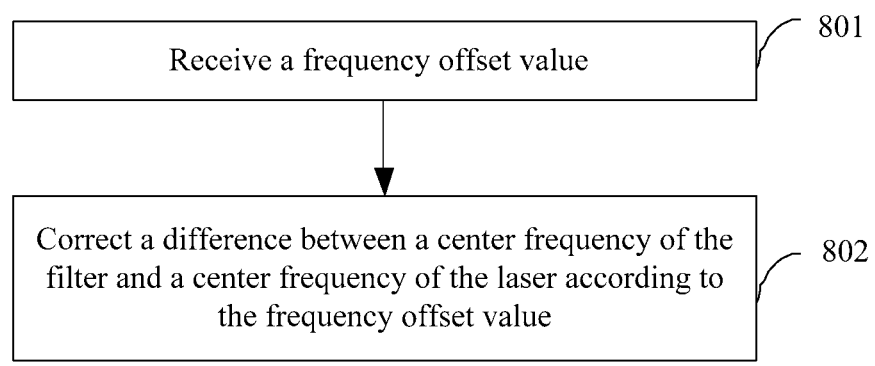
FIG. 8 is a schematic flowchart of a frequency offset correction method according to another embodiment of the present invention.

FIG. 8 is a schematic flowchart of a frequency offset correction method according to another embodiment of the present invention. The method provided in this embodiment may be executed by a transmitter configured to send an OFDM signal in an OFDM system. The OFDM system further includes a receiving device configured to receive the OFDM signal, and the receiving device may be the receiving device in the foregoing embodiment. As shown in FIG. 8, the frequency offset correction method includes:

801. Receive a frequency offset value.

The frequency offset value is used to indicate a degree and a direction that are of a difference that is between a center frequency of a laser configured to transmit the OFDM signal in the transmitter and a center frequency of a filter and that deviates from a first threshold, the filter includes a multiplexer configured to filter the OFDM signal in the transmitter, and the first threshold is a difference between a center frequency of the filter and a center frequency of the laser when a bit error rate of the OFDM signal is lowest.

It should be noted that, if the receiving device further includes a demultiplexer configured to filter the OFDM signal, the filter further includes the demultiplexer. The center frequency of the filter is an equivalent center frequency obtained by cascading the multiplexer and the demultiplexer, where the equivalent center frequency is a center frequency of an overlapping filtering window between a filtering window of the multiplexer and a filtering window of the demultiplexer.

802. Correct a difference between a center frequency of the filter and a center frequency of the laser according to the frequency offset value.

Optionally, if the frequency offset value indicates that the difference between the center frequency of the laser and the center frequency of the filter deviates from the first threshold towards a difference increasing direction, the center frequency of the laser is adjusted towards a difference decreasing direction, where an adjustment amplitude is equal to an absolute value of the frequency offset value; or if the frequency offset value indicates that the difference between the center frequency of the laser and the center frequency of the filter deviates from the first threshold towards a difference decreasing direction, the center frequency of the laser is adjusted towards a difference increasing direction, where an adjustment amplitude is equal to an absolute value of the frequency offset value, so that the difference between the center frequency of the laser and the center frequency of the filter remains stable, and therefore a subcarrier at a fading point can be filtered out after the filter performs single sideband filtering.

Based on the frequency offset value $y=(v_1-v_2)-\Delta$ where $v_1$ is the center frequency of the filter, $v_2$ is the center frequency of the laser, and $\Delta$ is the first threshold, specifically, when the frequency offset value is $-S$, the difference $(v_1-v_2)$ between the center frequency of the filter and the center frequency of the laser deviates from the first threshold towards the difference decreasing direction; or when the frequency offset value is $+S$, the difference $(v_1-v_2)$ between the center frequency of the filter and the center frequency of the laser deviates from the first threshold towards the difference increasing direction; where a value range of $S$ is a positive number.

When frequency offset correction is performed, the method in this embodiment usually needs to be repeatedly executed for multiple times until frequency offset correction is completed, that is, the power parameter of the pilot in the OFDM signal received by the receiving device is within a preset range. However, a quantity of times of repeatedly executing the method in this embodiment should not be greater than a preset maximum quantity of execution times, and if a total quantity of times of repeatedly executing the method is greater than the maximum quantity of execution times, it indicates that an exception of an endless loop occurs.

In this embodiment of the present invention, after a power parameter of a pilot in an OFDM signal received by a receiving device is detected, a frequency offset value used to indicate a degree and a direction that are of a difference that is between a center frequency of a laser and a center frequency of a filter and that deviates from a first threshold is determined according to the power parameter of the pilot, and then the receiving device corrects the difference between the center frequency of the laser and the center frequency of the filter according to the determined frequency offset value, thereby implementing frequency offset correction of an OFDM system. Because in a frequency offset correction process, frequency offset correction is performed according to the difference between the center frequency of the laser and the center frequency of the filter, which is not only applicable to frequency offset caused by offset of the center frequency of the laser, but also applicable to frequency offset caused by offset of the center frequency of the filter, efficiency of frequency offset correction is improved.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A frequency offset correction method comprising:
   detecting a power parameter of a pilot in a received orthogonal frequency division multiplexing (OFDM) signal;
   determining a frequency offset value according to the power parameter of the pilot, wherein the frequency offset value is used to indicate a degree and a direction that are of a difference that is between a center frequency of a laser configured to transmit the OFDM signal in a transmitter and a center frequency of a filter and that deviates from a first threshold, the filter comprises a multiplexer configured to filter the OFDM signal in the transmitter, and the first threshold is a difference between a center frequency of the filter and a center frequency of the laser when a bit error rate of the OFDM signal is lowest; and
   sending the frequency offset value.

2. The frequency offset correction method according to claim 1, wherein determining the frequency offset value according to the power parameter of the pilot comprises:
   performing calculation according to a linear correspondence between a predetermined power parameter (p) of the pilot and the frequency offset value (y), so as to obtain the frequency offset value y=kp+c, wherein k and c are constants.

3. The frequency offset correction method according to claim 1, wherein determining frequency offset value according to the power parameter of the pilot comprises:
   comparing the power parameter (p) of the pilot with a second threshold $P_0$, wherein the second threshold is a power parameter of the pilot that is detected when the difference between the center frequency of the filter and the center frequency of the laser is equal to the first threshold; and
   a) if the power parameter p of the pilot is greater than the second threshold $P_0$, determining that the frequency offset value is +S; or
   b) if the power parameter p of the pilot is less than the second threshold $P_0$, determining that the frequency offset value is −S;
   wherein S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

4. The frequency offset correction method according to claim 2, wherein before performing the calculation according to the linear correspondence between the predetermined power parameter p of the pilot and the frequency offset value y, so as to obtain the frequency offset value y=kp+c, the constants k and c are obtained by testing the linear correspondence between the power parameter p of the pilot and the frequency offset value $y=(v_1-v_2)-\Delta$ in a manner in which the center frequency $v_1$ of the filter remains unchanged and the center frequency $v_2$ of the laser is shifted, and $\Delta$ is the first threshold.

5. A frequency offset correction method comprising:
   receiving a frequency offset value that indicates a degree and a direction that are of a difference that is between a center frequency of a laser configured to transmit an orthogonal frequency division multiplexing (OFDM) signal in a transmitter and a center frequency of a filter and that deviates from a first threshold,
   wherein the filter comprises a multiplexer configured to filter the OFDM signal in the transmitter, and the first threshold is a difference between a center frequency of the filter and a center frequency of the laser when a bit error rate of the OFDM signal is lowest; and
   correcting the difference between the center frequency of the filter and the center frequency of the laser according to the frequency offset value.

6. The frequency offset correction method according to claim 5, wherein correcting the difference between the center frequency of the filter and the center frequency of the laser according to the frequency offset value comprises:
   if the frequency offset value indicates that the difference between the center frequency of the filter and the center frequency of the laser deviates from the first threshold towards a difference increasing direction,
   adjusting the center frequency of the laser towards a difference decreasing direction, wherein an adjustment amplitude is equal to an absolute value of the frequency offset value; or
   if the frequency offset value indicates that the difference between the center frequency of the filter and the center frequency of the laser deviates from the first threshold towards a difference decreasing direction,
   adjusting the center frequency of the laser towards a difference increasing direction, wherein an adjustment amplitude is equal to an absolute value of the frequency offset value.

7. The frequency offset correction method according to claim 6, wherein the frequency offset value $y=(v_1-v_2)-\Delta$, $v_1$ is the center frequency of the filter, $v_2$ is the center frequency of the laser, and $\Delta$ is the first threshold; and
   before the adjusting the center frequency of the laser towards a difference decreasing direction, wherein an adjustment amplitude is equal to an absolute value of the frequency offset value, the method further comprises:
   when the frequency offset value is −S, determining that the difference $(v_1-v_2)$ between the center frequency of the filter and the center frequency of the laser deviates from the first threshold towards the difference decreasing direction, wherein a value range of S is a positive number; or
   before the adjusting the center frequency of the laser towards a difference increasing direction, wherein an adjustment amplitude is equal to an absolute value of the frequency offset value, the method further comprises:
   when the frequency offset value is +S, determining that the difference $(v_1-v_2)$ between the center frequency of the filter and the center frequency of the laser deviates from the first threshold towards the difference increasing direction, wherein a value range of S is a positive number.

8. A receiving device comprising:
   a detector configured to detect a power parameter of one or more pilots in a received orthogonal frequency division multiplexing (OFDM) signal;
   a memory configured to store a program;
   a processor configured to execute the program stored in the memory, so as to determine a frequency offset value according to the power parameter of the pilot, wherein the frequency offset value is used to indicate a degree and a direction that are of a difference that is between a center frequency of a laser configured to transmit the OFDM signal in a transmitter and a center frequency of a filter and that deviates from a first threshold, the filter comprises a multiplexer configured to filter the OFDM signal in the transmitter, and the first threshold is a difference between a center frequency of the filter and a center frequency of the laser when a bit error rate of the OFDM signal is lowest; and a communications interface configured to send the frequency offset value.

9. The receiving device according to claim 8, wherein:
the processor is further configured to perform calculation according to a linear correspondence between the power parameter p of the pilot and the frequency offset value y, so as to obtain the frequency offset value y=kp+c, wherein k and c are constants.

10. The receiving device according to claim 8, wherein:
the processor is further configured to compare the power parameter p of the pilot with a second threshold $P_0$, wherein the second threshold is a power parameter of the pilot that is detected when the difference between the center frequency of the filter and the center frequency of the laser is equal to the first threshold; and
a) if the power parameter p of the pilot is greater than the second threshold $P_0$, determine that the frequency offset value is +S; or
b) if the power parameter p of the pilot is less than the second threshold $P_0$, determine that the frequency offset value is −S;
wherein S is a step at which the center frequency of the laser is shifted when the difference between the center frequency of the filter and the center frequency of the laser is equal to the first threshold in a manner in which the center frequency of the filter remains unchanged and the center frequency of the laser is shifted, so as to detect the second threshold $P_0$.

11. The receiving device according to claim 8, wherein:
the power parameter of the one or more pilots comprises a difference between power of a low frequency pilot and power of a high frequency pilot, and at least one of the power of the low frequency pilot or the power of the high frequency pilot, wherein a frequency of a subcarrier used to carry the low frequency pilot is lower than a frequency of a subcarrier used to carry the high frequency pilot.

12. The receiving device according to claim 8, wherein the filter further comprises a demultiplexer configured to filter the OFDM signal in the receiving device; and
the center frequency of the filter is an equivalent center frequency obtained by cascading the multiplexer and the demultiplexer, wherein the equivalent center frequency is a center frequency of an overlapping filtering window between a filtering window of the multiplexer and a filtering window of the demultiplexer.

13. The receiving device according to claim 9, wherein prior to performing the calculation, the constants k and c are obtained by testing the linear correspondence between the power parameter p of the pilot and the frequency offset value y=$(v_1-v_2)$−Δ in a manner in which the center frequency $v_1$ of the filter remains unchanged and the center frequency $v_2$ of the laser is shifted, and Δ is the first threshold.

14. A transmitter comprising:
a communications interface configured to receive a frequency offset value that indicates a degree and a direction that are of a difference that is between a center frequency of a laser configured to transmit an orthogonal frequency division multiplexing (OFDM) signal in the transmitter and a center frequency of a filter and that deviates from a first threshold,
wherein the filter comprises a multiplexer configured to filter the OFDM signal in the transmitter, and the first threshold is a difference between a center frequency of the laser and a center frequency of the filter when a bit error rate of the OFDM signal is lowest;
a memory configured to store a program; and
a processor configured to execute the program stored in the memory, so as to correct the difference between the center frequency of the filter and the center frequency of the laser according to the frequency offset value.

15. The transmitter according to claim 14, wherein:
the processor is further configured to:
if the frequency offset value indicates that the difference between the center frequency of the filter and the center frequency of the laser deviates from the first threshold towards a difference increasing direction adjust the center frequency of the laser towards a difference decreasing direction, wherein an adjustment amplitude is equal to an absolute value of the frequency offset value; or
if the frequency offset value indicates that the difference between the center frequency of the filter and the center frequency of the laser deviates from the first threshold towards a difference decreasing direction, adjust the center frequency of the laser towards a difference increasing direction, wherein an adjustment amplitude is equal to an absolute value of the frequency offset value.

16. The transmitter according to claim 15, wherein the frequency offset value y=(v1−v2)−Δ, v1 is the center frequency of the filter, $v_2$ is the center frequency of the laser, and Δ is the first threshold; and
the processor is further configured to:
when the frequency offset value is −S, determine that the difference $(v_1-v_2)$ between the center frequency of the filter and the center frequency of the laser deviates from the first threshold towards the difference decreasing direction; or
when the frequency offset value is +S, determine that the difference $(v_1-v_2)$ between the center frequency of the filter and the center frequency of the laser deviates from the first threshold towards the difference increasing direction; wherein a value range of S is a positive number.

17. The transmitter according to claim 15, wherein the filter further comprises a demultiplexer configured to filter the OFDM signal in a receiving device; and
the center frequency of the filter is an equivalent center frequency obtained by cascading the multiplexer and the demultiplexer, wherein the equivalent center frequency is a center frequency of an overlapping filtering window between a filtering window of the multiplexer and a filtering window of the demultiplexer.

* * * * *